United States Patent [19]

Soulard et al.

[11] Patent Number: 5,078,515
[45] Date of Patent: Jan. 7, 1992

[54] OPTICAL FIBER CONNECTOR APPARATUS AND METHOD

[75] Inventors: Roger R. Soulard, Chelmsford; Eugene R. Whitcomb, Billerica, both of Mass.

[73] Assignee: Wang Laboratories, Inc., Lowell, Mass.

[21] Appl. No.: 622,691

[22] Filed: Dec. 5, 1990

[51] Int. Cl.$^5$ .............................................. G02B 6/42
[52] U.S. Cl. .................................... 385/89; 385/92
[58] Field of Search ............... 350/96.15, 96.20, 96.21, 350/96.22

[56] References Cited

U.S. PATENT DOCUMENTS

| | | | |
|---|---|---|---|
| 4,268,756 | 5/1981 | Crouse et al. | 250/551 |
| 4,307,934 | 12/1981 | Palmer | 350/96.20 |
| 4,533,209 | 8/1985 | Segerson et al. | 350/96.20 |
| 4,539,476 | 9/1985 | Donuma et al. | 250/227 |
| 4,758,719 | 7/1988 | Sasaki et al. | 250/227 |
| 4,838,641 | 6/1989 | Morimoto et al. | 350/96.21 |

Primary Examiner—Frank Gonzalez
Attorney, Agent, or Firm—Michael H. Shanahan; Kenneth L. Milik

[57] ABSTRACT

A connector provides alignment between an electro-optic device and an optical fiber of a optical fiber cable. The connector employs a holding member for removably retaining the working end of the optical fiber and an electro-optic device aligned with each other for communication therebetween. The holding member has a cavity in one side wall in which the device is removably retained, and a channel, from an opposite side wall to the base of the cavity, in which the optical fiber is positioned. The channel is of varying diameter, and includes a cavity facing end having a diameter which is sufficient to accomodate the optical fiber but which is smaller than the outer diameter optical fiber cable. The cavity facing end of the channel ensures alignment of the optical fiber with the device retained in the cavity. A clamp member comprising spreadable prongs secures the optical fiber cable in position in the larger diameter region of the channel of the holding member. The clamp member and holding member cooperate together to form a single connector unit which is easily accommodated on a circuit board and secureable thereto.

20 Claims, 5 Drawing Sheets

OPTICAL FIBER CONNECTOR APPARATUS AND METHOD

BACKGROUND OF THE INVENTION

Generally, an optical fiber consists of an optically transparent, flexible fiber core coaxially covered by an outer cladding. The fiber core is formed of glass and the cladding is formed of a glass material having an index of refraction which provides propagation of successive reflections of light in the fiber core along the length of the fiber core. Surrounding the outer cladding of the fiber is a protective buffer of plastic or PVC. The fiber (core and cladding) and buffer together make up a fiber optic cable. Plural of such optical cables are often carried in parallel in a common outer jacket and compose what is known as an optical fiber bundle.

An example of a typical optical fiber cable is shown in FIG. 1a. The cable 15 is shown extending from an outer jacket 9. Other cables are not shown in the outer jacket, but it will be understood that such jackets typically carry a number of optical fiber cables. As shown in FIG. 1a, the optical fiber cable 15 shown consists of an optical fiber 47 which is a core surrounded by a cladding material. Surrounding the cladding of the fiber 47 is a buffer material 16 which protects the fiber within.

As used herein the term "fiber optics" implies both single optical fiber cables and optical fiber bundles unless otherwise stated.

Fiber optics have enjoyed wide spread use in electro-optical and opto-mechanical systems. Example applications are communication systems and sensor systems. Typically an optical fiber transfers subject lightwaves from a source (e.g. a transmitter) to a desired receiver (e.g. a light detector) which in turn transmits responsive electrical signals or the like. In order to perfect such transfers between fiber optics and electro-optic devices (transmitters, detectors, etc.) various connectors have been used to ensure proper alignment between the fibers and devices.

A common connector employs a first member for fixedly holding the receiver/transmitter device aligned behind an aperture in the first member, and a second member for fixedly holding the optical fiber of interest. The two members screw together or otherwise fit together to place the end of the optical fiber in the vicinity of the aperture of the first member and hence aligned with the device. However, once the two members are fitted together, it is difficult to determine whether the fiber end is sufficiently close to the device. This often results in the fiber being a good distance from the electro-optic device such that the light coupling between the fiber and device is not maximized. To improve on this coupling, fibers used with the prior art connectors are polished on the end, often forming lens structures, to improve the coupling of the light to the device. However, this step adds times and expense to the connection procedure.

Another disadvantage of prior art connectors concerns the space (surface area and volume) that a connector occupies on a circuit board. That is, many of the applications of fiber optics involve coupling the multiple fibers of a fiber bundle to respective electronic devices and attaching the employed fiber-to-device connectors to the circuit board. Each connector must be of a position and size such that the board can accomodate them in an arrangement that minimizes bending of fibers. If optical fibers are excessively bent, losses and transfer errors are introduced.

SUMMARY OF THE INVENTION

The present invention provides a connector which, relative to the prior art, is easy to use, space efficient and inexpensive to manufacture.

The connector of the present invention utilizes a holding member which has a cavity in one side for removably retaining a desired electro-optic device. From a side opposite the one side, there is a channel to the cavity. The channel removably retains the end of an optical fiber of interest. The connector is made for use with an optical fiber which is surrounded by a buffer which together with the optical fiber makes up an optical fiber cable. In a preferred embodiment, the channel of the holding member narrows from the opposite side to the cavity. The buffer of the optical fiber cable is held in a first wider part of the channel at the opposite side end thereof. An exposed portion of the fiber which extends beyond the buffer is inserted into a remaining, narrow part of the channel leading to the cavity for making contact with the device retained in the cavity.

Clamping means maintain position of the optical fiber cable in the channel of the holding member such that the fiber is maintained in the narrow part of the channel leading to the cavity and in physical contact with the device therein.

In a preferred embodiment of the present invention, the clamping means comprises two prongs spaced apart from each other. The optical fiber cable is removably retained between the two prongs. In addition, a separating device is employed to momentarily further separate the two prongs sufficiently to initially position the optical fiber cable therebetween. Upon removal of the separator device, the two prongs generate the necessary squeezing force on the optical fiber cable to secure the fiber in position in the holding member channel.

Further in the preferred embodiment, the clamping means includes a base adapted to removably retain the holding member such that the two parts form a single unit. In addition, attachment means are employed for attaching the formed unit to a working surface (e.g. a circuit board) through one of the base and holding member. Such means include, for example, a screw or similar fastener.

The connector components are preferably formed of molded plastic, and in the preferred embodiment, they are injection molded. The shape of an outside perimeter of the connector in the preferred embodiment is trapezoidal. The side of the apparatus toward which the cavity retaining the electro-optic device is located is larger than the opposite side toward which the channel for the fiber is located. This allows several connectors to be placed adjacent one another with the distance between their fiber channels minimized.

In an alternative embodiment, the holding member comprises a base adapted to removably retain the clamping means such that the two parts form a single unit. Either of these two embodiments allow the two parts to be handled easily. As long as one of the two components removably retains the other, they fit together to form a single unit.

In using the present invention connector, the fiber cable is moved with respect to the channel toward the cavity. This movement is in a manner such that the exposed region of the fiber is funneled into a narrow part of the channel and ultimately makes contact with the electro-optic device removably retained in the cavity. The optical fiber cable is then clamped in place, and the user is ensured of proper alignment between the device and the subject optical fiber. This further ensures low loss light transfer between the fiber and the optoelectronic device.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

FIG. 1c is a side view of a connector of FIG. 1a.

FIG. 2b is an end perspective of the clamping base of FIG. 2a.

FIG. 3b is an end view of the holding member of FIG. 3a.

FIG. 4b is an end view of a clamping member of the embodiment of FIG. 4a.

DETAILED DESCRIPTION OF THE PREFERRED EMBODIMENTS

For purposes of the present description, the term optical fiber, or fiber, refers to the combination of a fiber core surrounded by cladding. The term fiber optic cable, or cable, refers to the combination of the optical fiber surrounded by a protective buffer.

Figure 1A:
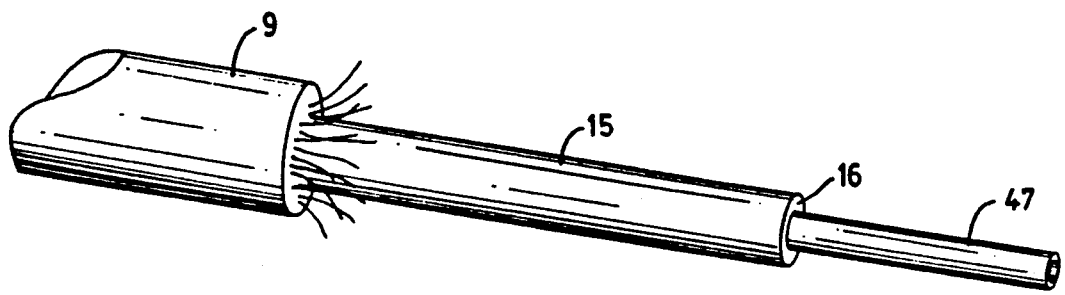
FIG. 1a shows the components of a typical fiber optic cable.
Figure 1B:
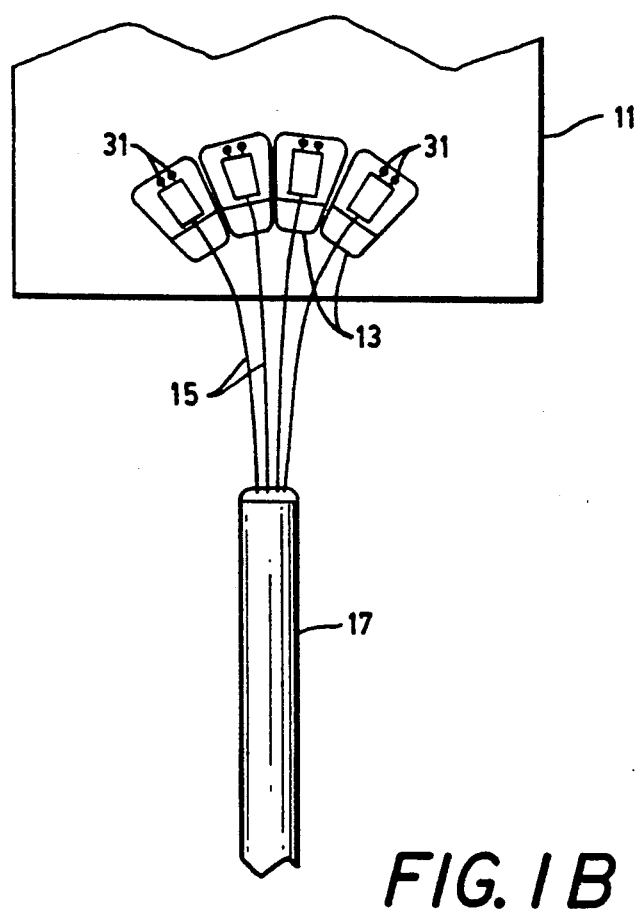
FIG. 1b is a plan view of fiber-to-device connectors embodying the present invention mounted to a circuit board.

Illustrated in FIG. 1b is a circuit board 11 carrying several connectors 13 of the present invention. Each optical fiber cable 15 of a fiber bundle 17 is connected to a respective electronic element or device through a respective connector 13. The connectors 13 are mounted to the board 11 in an arrangement which minimizes bending of individual cables 15. Since the more an optical fiber is bent, the more the losses of that fiber increase, it is advantageous to reduce this bending as much as possible.

As shown in FIG. 1b, the size and shape of the connectors 13 is particularly advantageous to providing a minimum-loss optical to electrical connection. Since the fiber bundle 17 is relatively thin, the unique trapezoidal shape of the connectors 13 allows them to be aligned adjacent one another such as to minimize the bending of fibers entering the connectors. With the connectors 13 positioned as in FIG. 1b, the front sides of the connectors facing the fiber bundle together form an arcuate shape. Thus, the direction from which each fiber cable 15 must enter its respective connector 13, requires only a single-direction bend of the fiber, with a minimized bend radius. The trapezoidal shape also allows the points at which the fibers enter the connectors 13 to be very close so as to further minimize bending. It is also noted that in the preferred embodiment, the shape of connectors is such that when they are butted together as in FIG. 1b, the distance between the point at which a cable 15 leaves the bundle 17 and the front side of each connector 13 is approximately the same. Thus, the cables 15 of the bundle 17 can all be cut to the same length prior to connecting the fibers they enclose to the connectors 13. This greatly simplifies pre-connection preparation.

Figure 1C:
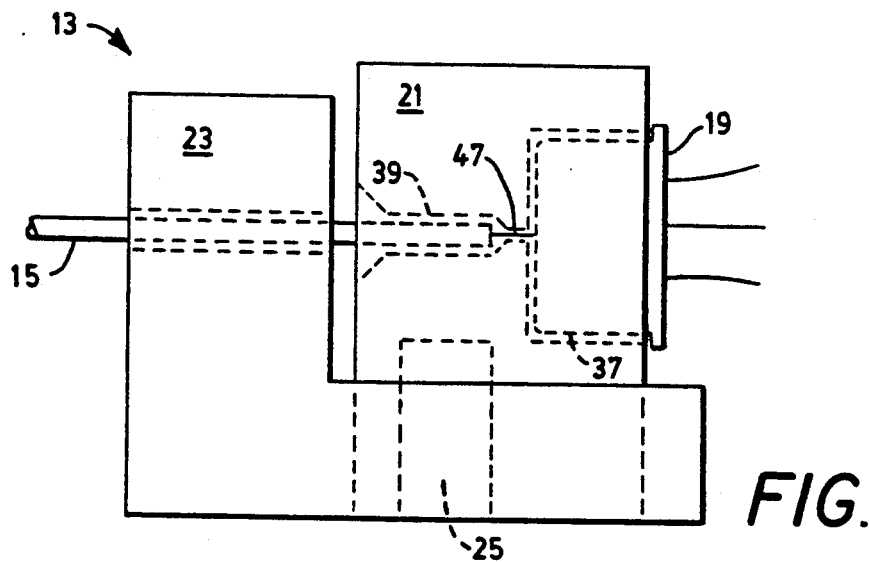

As shown more clearly in FIG. 1c, each connector 13 employs a holding member 21 and a clamp base member 23. The desired electronic device 19 sits in a depressed cup area or cavity 37 in one side of the holding member 21. The fiber cable 15 is provided access to the device 19 through a channel 39 leading from an opposite side of the holding member 21 to the base of cavity 37. The clamp base member 23 provides a groove 33 for clamping and hence maintaining the cable 15 in position in the holding member channel 39. Further the clamp base member 23 has an opening 29 for removeable retention of the holding member 21 such that the two members form a single unit for subsequent handling. A screw or other fastener (not shown) through threaded aperture 25 in holding member 21 secures the connector unit 13 to the working surface of interest.

FIGS. 3a-3b and 2a-2b show holding member 21 and clamp base member 23, respectively, of the preferred embodiment of the present invention. The holding member 21 and clamp base member 23 are preferably molded plastic or similarly fabricated plastic pieces. Accordingly, the holding member 21 and clamp base member 23 comprise polymeric molded thermoplastic such as PVC (polyvinyl chloride); however, polycarbonate or similar polymers are suitable. Injection molding is used in the preferred embodiment, but any other reasonable means of forming the members may be substituted. To that end, the present invention is inexpensive to manufacture, as well as easy to manufacture in batches of large numbers.

The use of soft materials, such as plastic, with the present invention is an important feature which distinguishes it from the known prior art. All of the materials of the present invention are softer than the fiber, and hence, do not scratch the fiber. As is well known in the art, scratching of a fiber results in light being lost through the irregular structure caused by the scratches, and signal strength is consequently reduced.

Figure 3A:
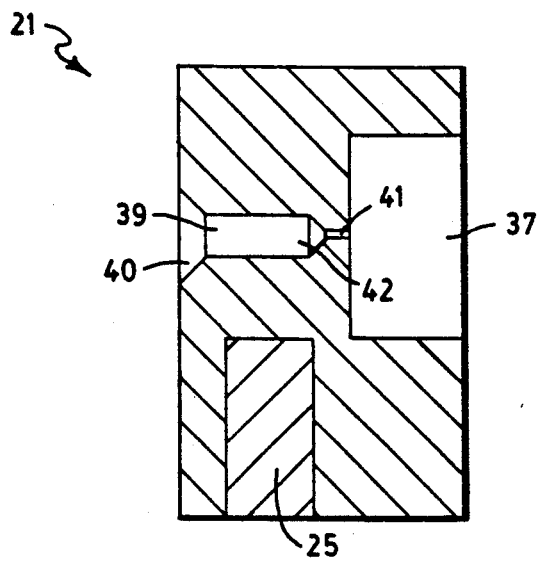
FIG. 3a is a cross-section of a holding member of the embodiment of FIGS. 1a-1b.
Figure 3B:
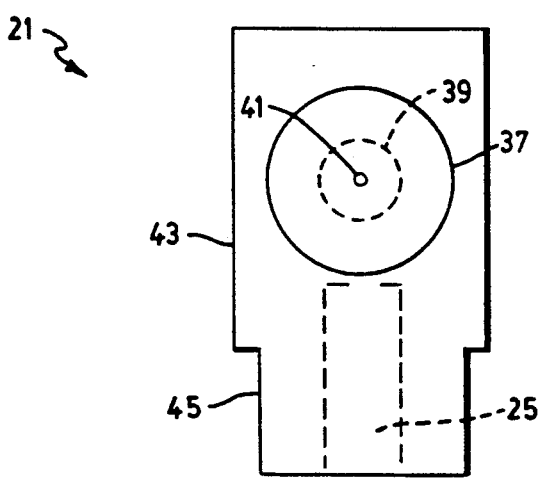

Referring to FIGS. 3a and 3b, the holding member 21 is generally block shaped with a lower portion uniformally narrower than the upper portion. The cavity 37 lies in one side of the upper portion and is shaped and sized to removably retain the desired electronic device 19. A center opening 41 in the base of the cavity 37 is the inner terminal of the channel 39 from the opposite side of the holding member 21 upper portion. The center opening 41 is of sufficient shape and size (e.g. circular with a sufficient diameter) to accomodate an end of a fiber 47 from a subject optical fiber cable 15 such that the fiber end is aligned with and faces the device 19 in cavity 37. In the preferred embodiment, the diameter of center opening 41 is 0.006 inches with a tolerance of +0.000 inch/−0.001 inch.

The channel 39 is generally circular in cross section along its length but has tapered regions 40, 42 which taper toward the cavity 37, as best illustrated in FIG.

3a. The outward facing end of the channel 39 (i.e., the end facing away from cavity 37) is tapered region 40 which changes from a diameter much larger than the outer diameter of the cable 15 of interest to the diameter of the intermediate portion of the channel 39. This provides easy insertion of the connector end of the cable 15 into the channel 39 of the holding member 21.

Adjacent the outward facing end of the channel 39 is intermediate portion of the channel 39. The intermediate channel portion has a diameter just larger than the outer diameter of the buffer of the subject fiber cable 15. In the preferred embodiment, the intermediate portion of channel 39 is 0.036 inches with a tolerance of +0.002 inches.

The intermediate channel portion serves as a guide for directing the fiber 15 into the cavity facing end of the channel 39. The cavity facing end of channel 39 terminates at the center opening 41. Hence, the cavity facing end of the channel 39 directly faces the electronic device 19 when the device is situated in cavity 37. The center opening 41 has a diameter sufficient to accomodate only the optical fiber 47 of the subject cable 15. The fiber 47 of the subject cable is inserted through this portion of the channel until it makes physical contact with the device 19 in cavity 37. The fiber 47 remains in contact with the device to ensure the optimum transfer of light between the optical fiber and device 19.

The ability of the connector 13 to hold the fiber 15 in contact with the device 19 and ensure that it stays secure in this position provides a distinct advantage over prior art connection devices. Prior art devices use two separate connector pieces, one holding an electro-optic device, and one holding a subject fiber. The fiber must be positioned relative to one connector piece before the two pieces are screwed together. Thus, there is no way to adjust the relative positioning of the fiber and the device except by mating the connector pieces together. It is recognized that in some instances, the prior art connector might put the fiber in contact with the device, but this effect is not ensured as it is with the present invention.

It is understood that a smooth taper instead of stepwise taper or other design of channel passages through the holding member 21 may be employed. At minimum, channel design must include a cavity facing end that accommodates only the fiber 47 and effects alignment between the leading tip of the fiber 47 and the device 19 in cavity 37.

Figure 2A:
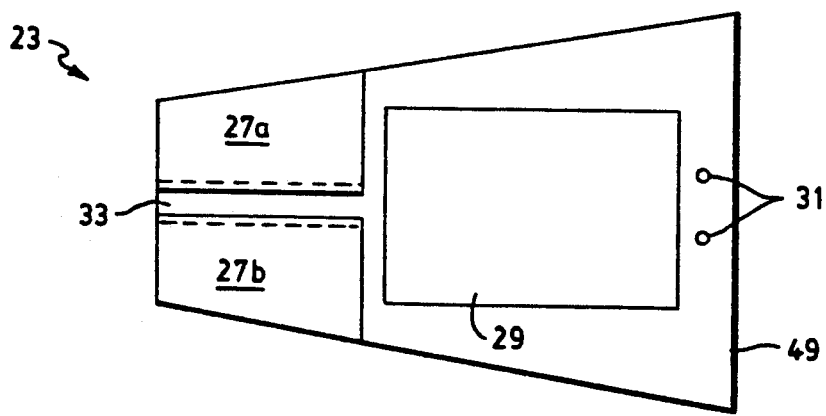
FIG. 2a is a plan view of a clamping base of the embodiment of FIGS. 1a-1b.
Figure 2B:
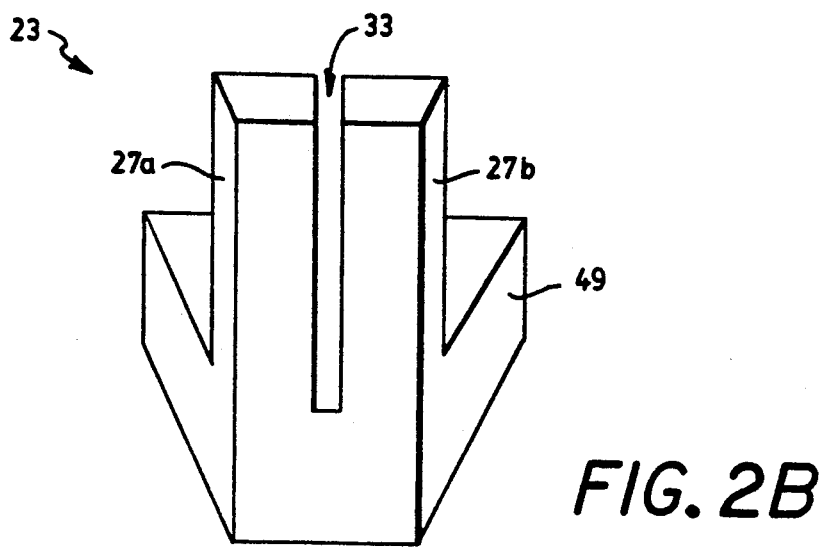

Referring to FIGS. 2a and 2b, the clamp base member 23 provides two prongs 27 extending from a support platform 49. The support platform 49 has an opening 29 therethrough in which the holding member 21 is removably retained. Hence, the opening 29 is of a shape and size which receives and accomodates the lower portion of the holding member 21. In the illustrated preferred embodiment, the opening 29 is rectangular in shape and just larger than the size of the rectangular cross-section of the lower portion of the holding member 21.

The two prongs 27a, 27b extending from the support platform 49 provide the clamping function necessary to maintain the fiber cable 15 in position in the holding member channel 39 as described above. In particular, the two prongs 27a, 27b are spaced apart from each other by an amount less than the outer diameter of the buffer of the subject optical fiber cable 15. As a result, when the subject optical fiber cable 15 is fitted between the two prongs 27a, 27b, the fiber 47 as well as the buffer surrounding the fiber is secured in place with respect to the holding member 21. As discussed below and shown in FIG. 2c, a separator tool 35 is used to temporarily or momentarily further separate the two prongs 27a, 27b a sufficient amount to initially place the subject optical fiber cable 15 therebetween. Such temporary further separation of the prongs 27 is made possible by the elasticity of the plastic material of which the clamp base member 23 is formed. Upon removal of the separator tool 35, the two prongs 27a, 27b apply the squeezing force necessary to retain the optical fiber cable 15 as desired.

Separator tool 35 is a generally T-shaped device having a cross-bar handle and an elongated portion extending therefrom. The distal end of the elongated portion is of a shape and size which is able to be wedged between prongs 27a, 27b of the clamp base member 23 and which separates the prongs by an amount greater than the outer diameter of a fiber cable. Generally, separator tool 35 is of sufficient rigidity with respect to the clamp base member prongs 27a, 27b to allow it to pry the prongs apart when manual force is applied.

Use of the embodiment of the present invention illustrated in FIGS. 1b–3b is described next. The clamp base member 23 and fiber cable 15 of interest are prepared as follows. A desired electro-optic device 19 is oriented facing into the cavity 37 in the one side of the holding member 21. In this position, the device 19 is manually press fitted into the cavity 37 until the face of the device 19 lies along the base of the cavity 37. If the connector 13 is to be mounted to a printed circuit board, the leads of the device 19 are placed through lead holes 31 so they may be conveniently passed through connection holes of the printed circuit board.

Prior to inserting the fiber cable into the connector, a region of the buffer of the fiber cable is stripped away to expose the fiber 47. The length of exposed fiber is made to be approximately the length between the wide end of the tapered region 42, and the surface of the device 19. This approximation is made with any discrepancies in the length being toward making the exposed fiber region longer rather than shorter than the desired length. This ensures contact between the fiber 47 and the surface of device 29.

Once the end of the cable 15 has been stripped, the end of the fiber 47 which is to face the subject electro-optic device 19 is cleaved. Since contact is established between the fiber 47 and the surface of the device 19, the present invention relies on a good cleave rather than subsequent polishing of the end of the fiber. Since prior art devices do not ensure the proximity of the fiber to the device which is achieved with the present invention, a polishing of the fiber end is relied upon to enhance light transfer in those prior art devices.

Figure 2C:
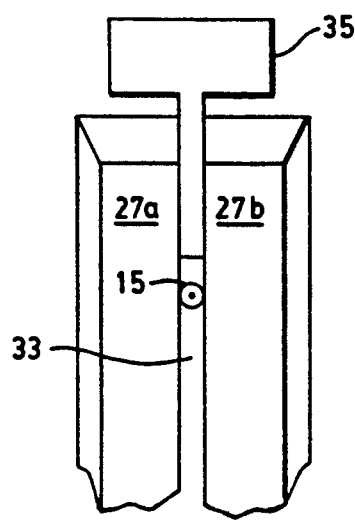
FIG. 2c is a partial end view of the prongs of the clamping base of FIG. 2a being further separated by a separator device.

After cleaving, the separator tool 35 (FIG. 2c) is wedged between the prongs 27a, 27b of the clamp base member 23 to temporarily widen the gap or space 33 between the two prongs. Leading with the cleaved end of the optical fiber 47, the fiber cable 15 is threaded between the prongs 27 and under the separator tool as illustrated in FIG. 2c, to the holding member side of the clamp base member 23. The separator tool 35 is left wedged between the two prongs 27a, 27b until a later step.

The end of the cable 15 with the exposed fiber is inserted into the channel 39 through the opposite side of the holding member 21. The cable 15 is pushed into the channel 39 until the subject end of the fiber 47 makes contact with the device 19 through the cavity center opening 41 (or inner terminal of the channel). Upon contact being made between the fiber 47 and the device 19 through the cavity center opening 41, the separator tool 35 is removed from between the two prongs 27 of the clamp base member 23, to hold the fiber 47 in the achieved position. Thereafter the squeezing force of the clamp base member prongs 27 maintains the desired cable 15 position within the channel 39 and the perfected connection between the optical fiber 47 and the electro-optic device 19.

At this juncture with the holding member 21 removably retained in the clamp base member 23 and the fiber cable 15 secured in position, connector 13 may be handled as a single unit. To that end the connector 13 is positioned as desired on the subject working surface such as circuit board 11 (FIG. 1b). With the connector 13 in position on board 11, device leads may be threaded through pin holes 31 in base 23 and soldered or otherwise connected to the board 11. The connector 13 itself may be secured to the board 11 using a screw or other fastener in corresponding aperture 25 through the underside of the holding member 21.

One of the notable features of the connector of the present invention is the manner in which relative orientation of the fiber cable 15 and the device is maintained. Prior art couplers require the relative positioning of two connector pieces to set the distance between a fiber and a device to which it is coupled. The present invention, however, has holding member 21 and clamp base member 23 which, when assembled, are fixed in position relative to one another. Thus, the relative positioning of the two members 21, 23 does not change to affect the relative positioning of the fiber 47 and the device 19. In this sense, the members 21, 23 function as a single unit rather than two individual pieces.

Figure 4A:
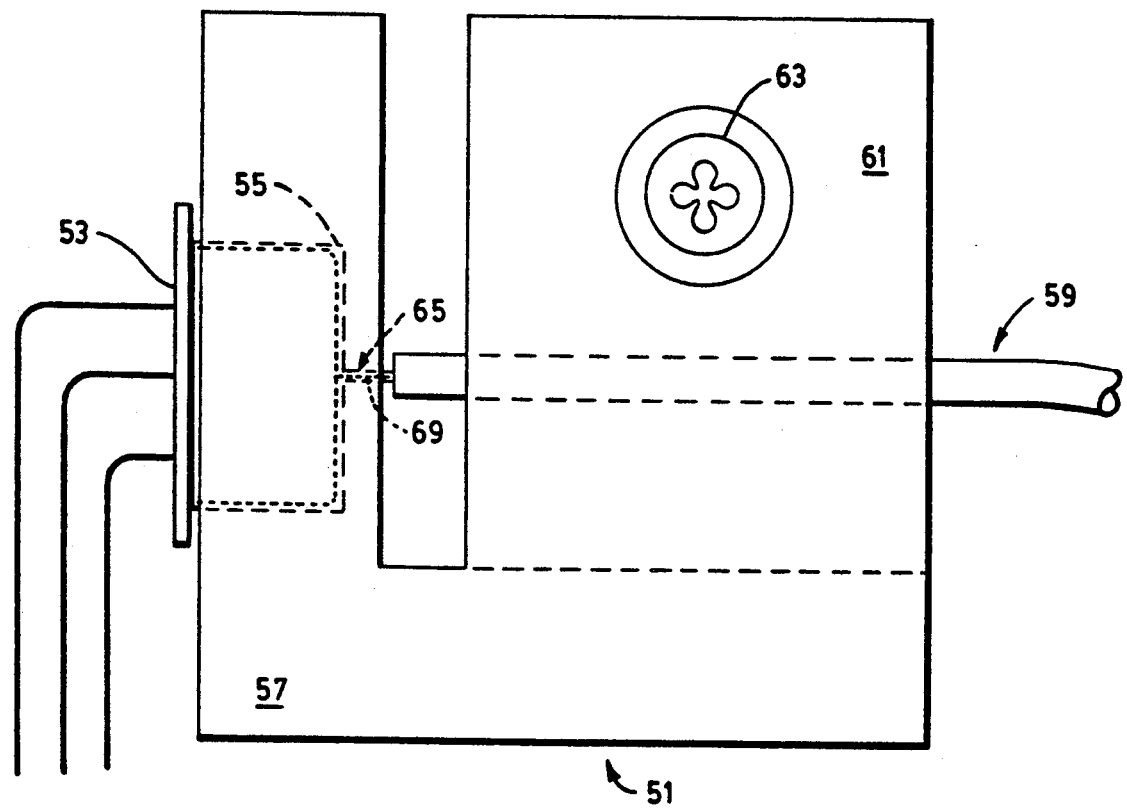
FIG. 4a is a side view of another embodiment of the present invention.
Figure 4B:
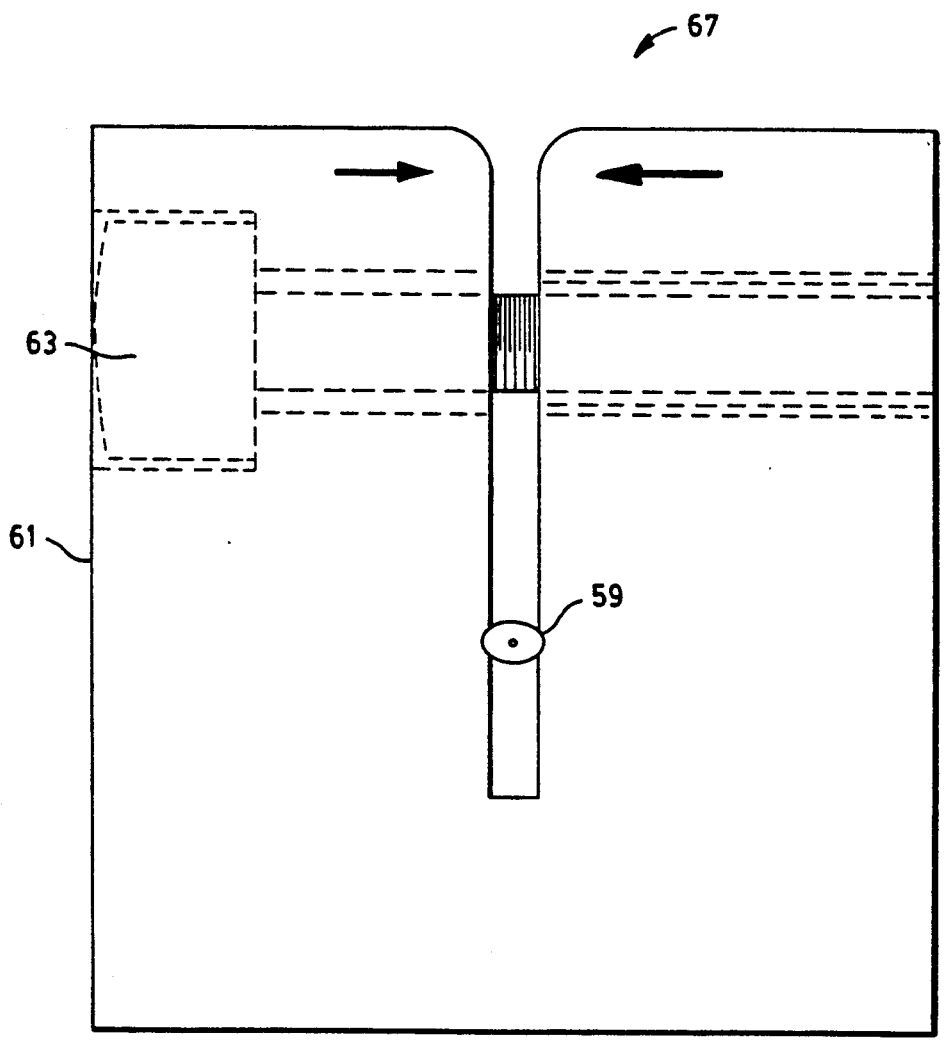

Another embodiment of the present invention is illustrated in FIGS. 4a and 4b and described next. In this embodiment a support member 57 serves as a base as well as a receptacle for the electro-optical device 53. A cavity 55 in a side wall of the support member 57 is of a shape and size which corresponds to the device 53 and provides removable retention thereof. A channel 65 leads from an opening in an opposite upper side wall to an opening in the base of the cavity 55. The channel 65 has a diameter which is sufficient to accomodate the fiber 69 of an optical fiber cable 59 but which is smaller than the outer diameter of the buffer of the cable 59. The channel 65 serves as a conduit for the fiber 69 to align the tip of the fiber 69 with the electro-optic device 53 situated in cavity 55. To that end the support member 57 ensures directing of the optical fiber 59 to the desired surface of device 53.

Through a lower planar wall or base portion of the support member 57 there is an opening for receiving the clamping member 61 described later. The opening is of a shape and size which corresponds to the outer geometry of a lower portion of the clamping member 61 such that the clamping member is removably retained in the support member opening. As in the previous embodiment, both the support member and the clamping member are preferably injection-molded plastic to provide low expense, ease of manufacture, and low incidence of scratching of the fiber.

Shown in FIG. 4b, the clamping member 61 provides a slot or groove 67 through which the subject fiber cable 59 easily fits. Spacing between the walls forming the groove 67 is adjustable by tightening means such as a screw 63 which bridges between the groove walls. To that end the tightening means narrows the groove 67 by bringing the groove walls closer together. This in turn provides the necessary squeezing force and hence clamping action on the fiber cable 59 in groove 67 to secure position the of the optical fiber 69 in the support member channel 65.

Operation of the connector 51 of FIGS. 4a and 4b is thus as follows. A region of the buffer of cable 59 is stripped away to provide a length of exposed fiber long enough to extend through channel 65 and contact the device 53. The end of the optical fiber 69 which is to communicate with the device 53 of interest is then cleaved. The device 53 is positioned facing into the cavity 55 in the support member 57 and manually press fitted therein. With the clamping member 61 separated from the support member 57, the screw 63 therein is loosened such that the walls forming the groove 67 are in an untightened or relaxed state. Leading with the cleaved end of the optical fiber 69, the fiber cable 59 is threaded through the clamping member groove 67 and loosely positioned to reach the channel opening in the side wall of the support member 57.

Next, the clamping member 61 is oriented with the cleaved end of the optical fiber 69 facing the support member 57 side wall. Maintaining this orientation the clamping number 61 is placed into the support member 57 opening such that the clamping member 61 is removably retained therein. With the screw 63 remaining untightened, the length of the cable 59 extending from the device-facing side of the clamping member 61 to the support member side wall is adjusted. In particular, the length of the working end of the cable 59 is adjusted such that the cleaved end of the fiber abuts the side wall of the support member 57. Thereafter, the cable 59 is held and the fiber 69 is inserted into the opening in the side wall and into the channel 65. The fiber 69 is slid from the outer jacket, along the length of the channel 65 and into the opening in the base of the cavity 55 until physical contact is made with the device 53 therein.

After physical contact has been made between the fiber 69 and the device 53 retained in the cavity 55, the clamping member screw 63 is tightened to secure the fiber cable 59 in position. As a result, the fiber 69 is maintained in contact with the device 53 for maximized light transfer therebetween. Subsequently, the connector 51 may be attached to a desired working surface with the leads of the device 53 soldered or otherwise connected to the same as described for the embodiment of FIGS. 1b-3b.

While the invention has been particularly shown and described with reference to preferred embodiments thereof, it will be understood by those skilled in the art that various changes in form and details may be made without departing from the spirit and scope of the invention as defined in the appended claims.

We claim:

1. Apparatus for coupling an optical fiber to an electro-optic device, the optical fiber being surrounded by a buffer which together with the optical fiber makes up an optical fiber cable, the apparatus comprising:

a holding member having a cavity on one side for removably retaining the electro-optic device, and a channel from a side opposite the one side to the cavity for removably guiding one end of the optical fiber; and clamping means coupled to the holding member and positioned by said side opposite the one side for maintaining the position of the optical fiber cable in the channel of the holding member such that the relative positioning of the fiber and the electro-optic device is fixed, wherein the apparatus has a perimeter which is generally trapezoidal in shape such that a plurality of apparatuses positioned side by side with sides parallel form a generally circular array with optical fibers extending toward each other from the apparatuses.

2. An apparatus as claimed in claim 1 wherein the holding member further comprises a base adapted to removably retain the clamping means.

3. An apparatus as claimed in claim 1 further comprising means for attaching the holding member to a working surface.

4. An apparatus as claimed in claim 1 wherein both the holding member and the clamping means are formed of a plastic material.

5. An apparatus as claimed in claim 1 wherein the diameter of the channel varies along its length from about 0.006 inches to about 0.036 inches.

6. An apparatus as claimed in claim 1 wherein the cavity of the holding member is located to a first side of the apparatus which is larger than a second side of the apparatus opposite the first side.

7. Apparatus for coupling an optical fiber to an electro-optic device, the optical fiber being surrounded by a buffer which together with the optical fiber makes up an optical fiber cable, the apparatus comprising:
 a holding member having a cavity on one side for removably retaining the electro-optic device, and a channel from a side opposite the one side to the cavity for removably guiding one end of the optical fiber; and
 clamping means coupled to the holding member and positioned by said side opposite the one side for maintaining the position of the optical fiber cable in the channel of the holding member such that the relative positioning of the fiber and the electro-optic device is fixed, the clamping means including a base adapted to removably retain the holding member.

8. An apparatus as claimed in claim 7 further comprising attachment means for attaching one of the base and holding member to a working surface.

9. Apparatus for coupling an optical fiber to an electro-optic device, the optical fiber being surrounded by a buffer which together with the optical fiber makes up an optical fiber cable, the apparatus comprising:
 a holding member having a cavity on one side for removably retaining the electro-optic device, and a channel from a side opposite the one side to the cavity for removably guiding one end of the optical fiber; and
 clamping means coupled to the holding member and positioned by said side opposite the one side for maintaining the position of the optical fiber cable in the channel of the holding member such that the relative positioning of the fiber and the electro-optic device is fixed, the clamping means comprising two prongs spaced apart from each other for removably retaining the optical fiber cable therebetween.

10. An apparatus as claimed in claim 9 further comprising a separator device insertable between the two prongs sufficient to initially position the optical fiber cable therebetween.

11. An apparatus as claimed in claim 10 wherein the clamping means is formed of a material having resilience sufficient to return said two prongs to their original position after separation by the separator device.

12. Apparatus for coupling an optical fiber to an electro-optic device, the optical fiber being surrounded by a buffer which together with the optical fiber makes up an optical fiber cable, an exposed region of the optical fiber extending beyond the buffer at a first end of the optical fiber cable, the apparatus comprising:
 a holding member having (i) a cavity on one side for removably retaining the electro-optic device, and (ii) a channel from a side opposite the one side to the cavity for removably retaining a portion of the cable, the channel narrowing from the opposite side to the cavity such that the cable with the buffer is retained in a first part of the channel at said opposite side thereof and the exposed portion of the optical fiber is retained in a remaining part of the channel leading to the cavity for making contact with the device therein; and
 clamping means fixed in position relative to the holding member and maintaining the position of the cable in the channel of the holding member such that the position of the exposed portion of the fiber is maintained fixed relative to the position of the device held by the holding member, the clamping means including a base adapted to removably retain the holding member.

13. An apparatus as claimed in claim 12 further comprising attachment means for attaching one of the base and holding member to a working surface.

14. An apparatus as claimed in claim 12 wherein the clamping means maintains the fiber in contact with the electro-optic device.

15. Apparatus for coupling an optical fiber to an electro-optic device, the optical fiber being surrounded by a buffer which together with the optical fiber makes up an optical fiber cable, an exposed region of the optical fiber extending beyond the buffer at a first end of the optical fiber cable, the apparatus comprising:
 a holding member having (i) a cavity on one side for removably retaining the electro-optic device, and (ii) a channel from a side opposite the one side to the cavity for removably retaining a portion of the cable, the channel narrowing from the opposite side to the cavity such that the cable with the buffer is retained in a first part of the channel at said opposite side thereof and the exposed portion of the optical fiber is retained in a remaining part of the channel leading to the cavity for making contact with the device therein; and
 clamping means fixed in position relative to the holding member and maintaining the position of the cable in the channel of the holding member such that the position of the exposed portion of the fiber is maintained fixed relative to the position of the device held by the holding member comprising two prongs spaced apart from each other for removably retaining the optical fiber cable therebetween.

16. A method of coupling an optical fiber to an electro-optic device, the optical fiber being covered by a buffer such that the fiber and the buffer together make up an optical fiber cable, an exposed portion of the fiber extending a predetermined length beyond the buffer at a coupling end of the fiber, the method comprising the steps of:

providing a holding member having:
- (i) a cavity in one side for removably retaining a desired electro-optic device,
- (ii) a channel from a side opposite the one side and leading to the cavity for removably retaining at least the coupling end of the optical fiber of the cable; and
- (iii) a base adapted to removably retain a clamping means;

positioning a desired electro-optic device in the cavity of the holding member such that the device is removably retained therein;

aligning the coupling end of the optical fiber with the channel of the holding member;

moving the optical fiber in the channel toward the cavity in a manner such that the fiber is guided from the channel to the cavity, said moving being performed until the fiber physically contacts the electro-optic device in the cavity; and providing clamping means retained by the base of the holding member and securing the optical fiber cable with the clamping means to maintain position of the fiber in the channel of the holding member such that the fiber is maintained in contact with the device in the cavity.

17. A method as claimed in claim 16 further comprising the step of attaching the holding member to a working surface.

18. A method of coupling an optical fiber to an electro-optic device, the optical fiber being covered by a buffer such that the fiber and the buffer together make up an optical fiber cable, an exposed portion of the fiber extending a predetermined length beyond the buffer at a coupling end of the fiber, the method comprising the steps of:

providing a holding member having:
- (i) a cavity in one side for removably retaining a desired electro-optic device, and
- (ii) a channel from a side opposite the one side and leading to the cavity for removably retaining at least the coupling end of the optical fiber of the cable;

positioning a desired electro-optic device in the cavity of the holding member such that the device is removably retained therein;

aligning the coupling end of the optical fiber with the channel of the holding member;

moving the optical fiber in the channel toward the cavity in a manner such that the fiber is guided from the channel to the cavity, said moving being performed until the fiber physically contacts the electro-optic device in the cavity; and securing the optical fiber cable to maintain position of the fiber in the channel of the holding member such that the fiber is maintained in contact with the device in the cavity by providing a base having clamping means; clamping the cable in the clamping means; and removably retaining the holding member in the base.

19. A method as claimed in claim 18 further comprising the step of attaching one of the base and holding member to a working surface.

20. A method of coupling an optical fiber to an electro-optic device, the optical fiber being covered by a buffer such that the fiber and the buffer together make up an optical fiber cable, an exposed portion of the fiber extending a predetermined length beyond the buffer at a coupling end of the fiber, the method comprising the steps of:

providing a holding member having:
- (i) a cavity in one side for removably retaining a desired electro-optic device, and
- (ii) a channel from a side opposite the one side and leading to the cavity for removably retaining at least the coupling end of the optical fiber of the cable;

positioning a desired electro-optic device in the cavity of the holding member such that the device is removably retained therein;

aligning the coupling end of the optical fiber with the channel of the holding member;

moving the optical fiber in the channel toward the cavity in a manner such that the fiber is guided from the channel to the cavity, said moving being performed until the fiber physically contacts the electro-optic device in the cavity; and securing the optical fiber cable to maintain position of the fiber in the channel of the holding member such that the fiber is maintained in contact with the device in the cavity by:
- providing clamping means having two prongs spaced apart from each other for removably retaining the optical fiber cable therebetween; and
- with a separator device momentarily further separating the two prongs sufficient to initially position the optical fiber cable therebetween.

* * * * *